Sept. 8, 1959   H. A. RIESTER, JR., ET AL   2,903,323
STRIP CHART ASSEMBLY
Filed Sept. 24, 1957   2 Sheets-Sheet 1

INVENTOR.
Hubert A. Riester Jr.
BY Carl J. Kugler
Ralph Hammar
attorney

Sept. 8, 1959  H. A. RIESTER, JR., ET AL  2,903,323
STRIP CHART ASSEMBLY
Filed Sept. 24, 1957  2 Sheets-Sheet 2

INVENTOR.
Hubert A. Riester Jr
Carl J. Kugler
BY Ralph Hammar
attorney

United States Patent Office 2,903,323
Patented Sept. 8, 1959

2,903,323

STRIP CHART ASSEMBLY

Hubert A. Riester, Jr., and Carl J. Kugler, Philadelphia, Pa., assignors to American Meter Company, Incorporated, Philadelphia, Pa., a corporation of Delaware Application September 24, 1957, Serial No. 685,849

5 Claims. (Cl. 346—136)

This invention is a recording instrument strip chart assembly designed so it can be replaced in the field within the time required to replace a circular chart. In a preferred form, the assembly consists of a chart supply roll, a take up roll on which the inked chart is wound, a drive for the rolls (excluding the motor), and a thumbing gear by which the chart may be moved forward or backward to permit inspection of any section of the chart. The assembly is preloaded so that changing charts in the field merely requires removal of the assembly carrying the inked chart and replacement with an assembly carrying a fresh chart.

Figure 1:
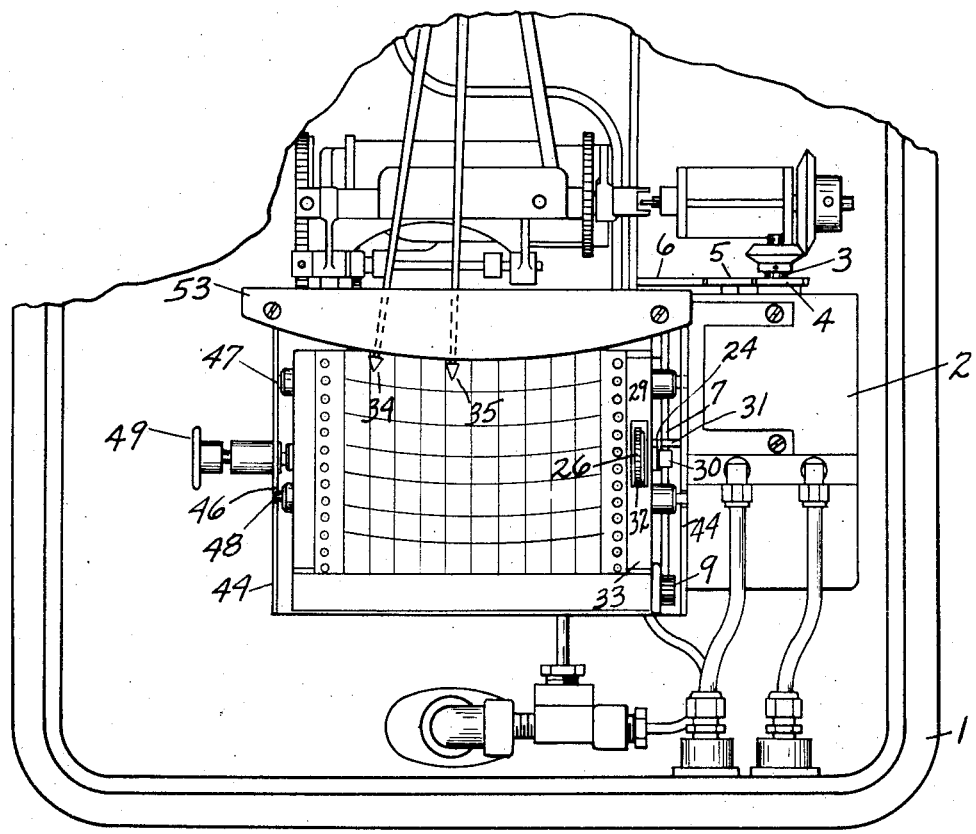
Figure 5:
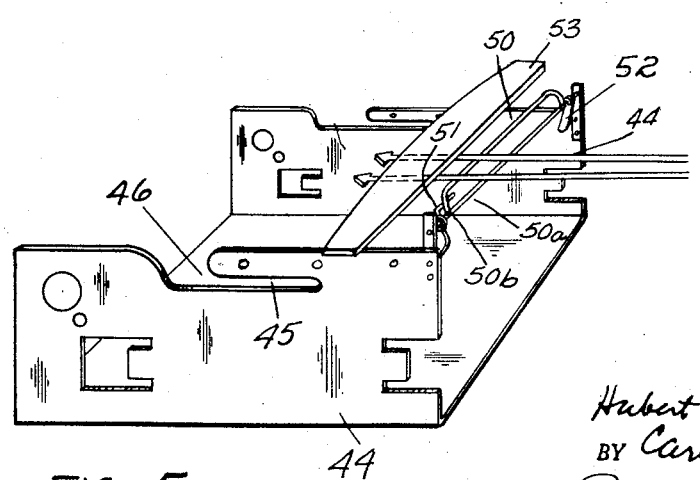
Figure 4:
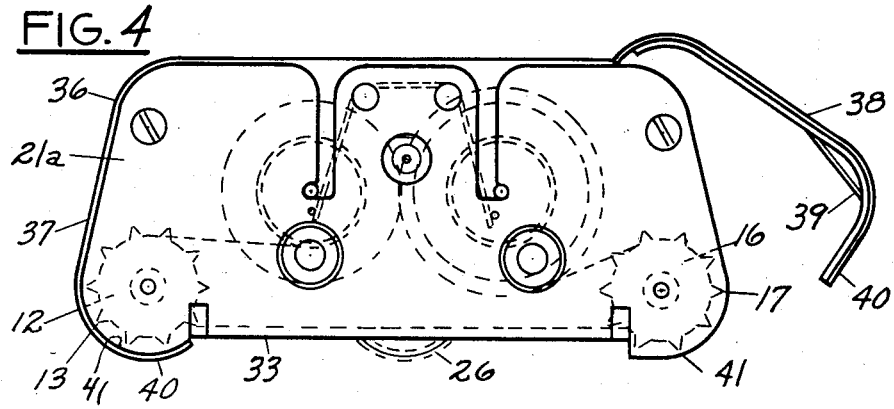
Figure 2:
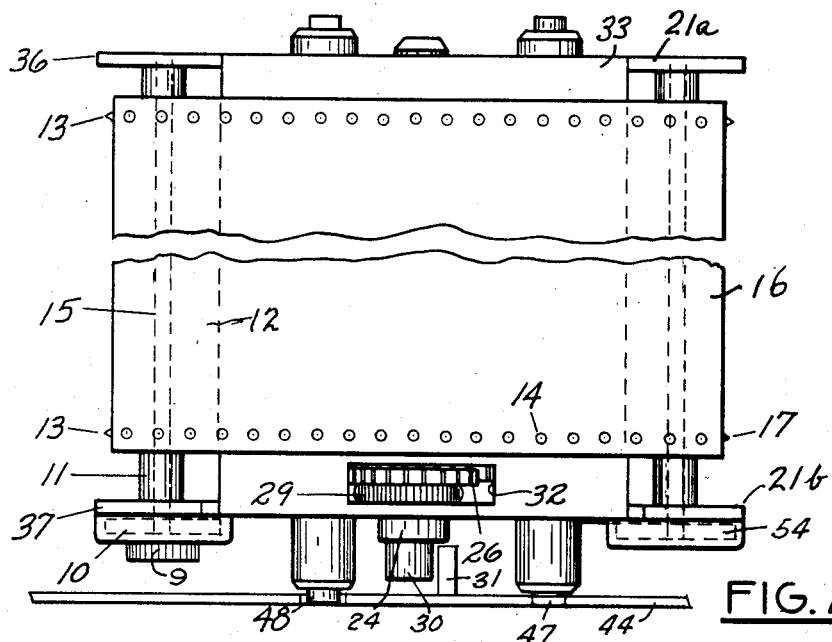
Figure 3:
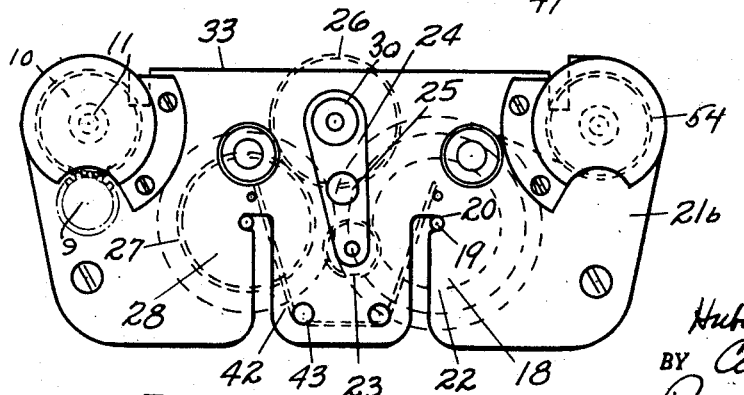

In the drawings, Fig. 1 is a front view of the lower half of an instrument equipped with a strip chart assembly, Fig. 2 is a top view of the strip chart assembly and of part of the supporting frame, Fig. 3 is a view of the driving end of the assembly, Fig. 4 is a view of the other end of the assembly, Fig. 5 is a side view of the frame for supporting the chart assembly in the instrument.

The instrument shown in Fig. 1 has a case 1 within which is mounted a motor 2 driving a shaft 3. A gear train 4, 5 and 6 drives a shaft 7 which in turn through suitable gearing (not shown) drives a pinion 9. The pinion 9 drives the chart through a gear 10 on shaft 11 fixed to drive roll 12 having sprocket teeth 13 at each end engaging perforations 14 in the strip chart 15. The chart while being driven is pulled to the left as viewed in Fig. 2 and causes a guide roll 16 at the right of the strip chart to turn in a counterclockwise direction as viewed in Fig. 3. The guide roll 16 has sprocket teeth 17 which engage the perforations 14 in the same manner as the teeth 13 on the guide roll 12. The rotation of the guide roll 16 pulls strip chart from a supply roll 18 having projecting shaft ends 19 at opposite ends held in offset slots 20 in end frame members 21a and 21b. Integral with the supply spool 18 is a gear 22 which meshes with a gear 23 at the lower end of a shift lever 24 pivoted at 25 on the end frame 21b. At the upper end of the lever 24 is a larger gear 26 which meshes with a gear 27 on the take up spool 28. The gears 23 and 26 are interconnected by a coil spring belt 29 which provides a slip friction drive maintaining at all times the proper tension on the take up spool 28. The gear 26 is enough larger than the gear 23 so that if there were no slip in the coil spring belt 29 the take up spool 28 would be driven faster than necessary to wind all of the chart even at the start when the supply spool 18 is full and the take up spool 28 is empty. The pivoted arm 24 has a rubber covered pin 30 which engages a stop 31 on the wall 44 of the chart supporting frame when the chart assembly is mounted in the instrument and pushes the upper end of arm 24 to the left as viewed in Fig. 3 or in the direction to rock the arm in a counterclockwise direction about its pivot 25 and mesh the gears 23 and 26 respectively with the gears 22 and 27. This causes the chart to be driven in proper direction so that the chart is drawn from the supply spool 18 and wound on the rewind spool 28.

When the chart assembly is out of the instrument, the gear 26 is accessible through a window 32 in the top wall 33 of the assembly frame and may be manually turned in either direction. The force required to turn the gear 26 is transmitted in part to the arm 24 and pivots it in the direction to cause the proper gear drive. For winding the chart from the supply spool 18 to the take up spool 28 the gear 26 would be turned in a counter-clockwise direction as viewed in Fig. 3 and the torque applied to the exposed part of the gear would pivot the upper end of the lever 24 to the left and bring the gear 26 into mesh with the gear 27 on the rewind spool 28. For unwinding inked chart from the take up spool 28, the gear 26 would be turned in a clockwise direction as viewed in Fig. 3 and the turning torque would pivot the upper end of the lever 24 to the right and bring the gear 26 into engagement with the gear 22 on the supply spool. The gear 26 may be conveniently turned by the operator's thumb and it is for that reason sometimes called a thumbing gear.

The main frame for the strip chart assembly consists of the top wall 33 which serves as a writing table for the instrument pens 34 and 35 and the depending sidewalls 21a and 21b. The space between the sidewalls 21a and 21b is enclosed by a removable cover 36 having at one end a rigid section 37 which extends up over the guide roll 12 and having at the other end a hinged section 38 which extends up over the guide roll 16. Both of the sections 37 and 38 have leaf springs 39 which engage the chart and hold it tight against the guide rolls 12 or 16 as the case may be. Since the springs 39 are part of the cover rather than part of the chart assembly frame, the springs are out of the way while the chart is being loaded or unloaded and come into action only when the cover is replaced on the frame. This eliminates any need for threading the chart under tension springs. The curved ends 40 snap in place over the correspondingly curved sections 41 on the sidewalls 21a and 21b. When the cover is removed, the supply and take up rolls 18 and 28 may be readily removed by overcoming the tension of U-shaped springs 42 carried on pins 43. The springs 42 exert a spreading force on the shafts of the supply and take up rolls and hold the shafts in the offset ends of the slots 20.

The chart assembly is removably mounted in the instrument on a U-shaped frame having end walls 44 shown in detail in Fig. 5. It will be noted that at the top of the walls 44 there is a slot 45 having an entrance 46 through which pins 47 and 48 on the chart assembly pass as the assembly is removed and replaced in the instrument. In the mounted position, the pins 48 lie in the slot 45 directly below the entrance 46 and the assembly is releasably latched in the frame by a spring catch 49. To remove the chart assembly, the lower end of the assembly is lifted out through the entrance 46 in the slot 45 and the assembly is pulled downward until the upper pins 47 come opposite the entrance after which the assembly can be easily lifted out. At the start of the removal of the chart assembly, it moves away from a crank arm 52 fixed to a shaft 50a to which is fixed a U-shaped pen lifter 50. A spring 51 at the end of the shaft 50a opposite the crank engages one of the arms 50b of the pen lifter and urges it in a clockwise direction as viewed in Fig. 5 so that the pen arms 34, 35 are lifted off the chart and held against the underside of plate 53. The pen lifting takes place at the very start of the removal so the chart is not marked as the assembly is removed. The pens are held in the lifted position until the assembly is replaced at which time the assembly contacts crank arm 52 and moves the pen lifter 50 away from the pins which then drop on the chart.

For integrating or rewinding, the chart may be driven by gear 54 which drives roll 16 in the same manner that the gear 10 drives the roll 12, but in the reverse direction.

What is claimed as new is:

1. A strip chart assembly comprising a chart supply roll and a drive gear therefor, a take up roll on which the chart is wound and a drive gear therefor, a pivoted lever between the rolls swingable between two positions and carrying a large gear on one side of its pivot and a small gear on the other side of its pivot, said small and large gears respectively meshing with the drive gear for the supply roll and the drive gear for the take up roll in one of said two positions and with the drive gear for the take up roll and the drive gear for the supply roll in the other of said two positions, a belt drive between the gears whereby the roll driven by the large gear is driven faster than the roll driven by the small gear in the absence of belt slippage, a drive for the chart, and means for holding the small gear in position to be driven by the roll from which the chart is unwound whereby the larger gear drives the roll on which the chart is wound and thereby maintains a tension on the chart proportional to the force at which the belt drive slips.

2. A strip chart assembly comprising a chart supply roll and a drive gear therefor, a take up roll on which the chart is wound and a drive gear therefor, a shift lever movable between two positions and carrying a large gear and a small gear, said small and large gears respectively meshing with the drive gear for the supply roll and the drive gear for the take up roll in one of said two positions and with the drive gear for the take up roll and the drive gear for the supply roll in the other of said two positions, a belt drive between the gears whereby the roll driven by the large gear is driven faster than the roll driven by the small gear in the absence of belt slippage, a drive for the chart, and means for holding the lever in the position in which the small gear is driven by the roll from which the chart is unwound whereby the larger gear drives the roll on which the chart is wound and thereby maintains a tension on the chart proportional to the force at which the belt drive slips.

3. A strip chart assembly comprising a chart supply roll and a drive gear therefor, a take up roll on which the chart is wound and a drive gear therefor, a shift lever mounted for movement between two positions and carrying a large gear and a small gear, said small and large gears respectively meshing with the drive gear for the supply roll and the other drive gear for the take up roll in one of said two positions and with the drive gear for the take up roll and the drive gear for the supply roll in the other of said two positions, a belt drive between the gears whereby the roll driven by the large gear is driven faster than the roll driven by the small gear in the absence of belt slippage, a portion of the periphery of said large gear being accessible for turning forward or backward by a manual force thereon in forward or backward directions, the force in the direction to turn the large gear forward being in the direction to shift the lever to said one position and the force in the direction to turn the large gear backward being in the direction to shift the lever to said other position whereby the chart may be moved manually either forward or backward with the proper tension maintained.

4. A strip chart assembly comprising a frame having a table over which the chart is moved and depending side walls, guide rolls mounted between the side walls at each end of the table, a chart supply roll mounted in the frame below the table for feeding chart mounted between the side walls to one of the guide rolls, a drive gear for the chart supply roll, a chart take up roll mounted between the side walls below the table for receiving chart from the other of the guide rolls, a drive gear for the chart take up roll, a gear in the chart assembly frame for driving said other guide roll for pulling the chart from the supply roll, a shift lever mounted on the frame for movement between two positions and carrying a large gear and a small gear, said small and large gears respectively meshing with the drive gear for the supply roll and the drive gear for the take up roll in one of said two positions and with the drive gear for the take up roll and the drive gear for the supply roll in the other of said two positions, a belt drive between the large and small gears whereby the roll driven by the large gear is driven faster than the roll driven by the small gear in the absence of belt slippage, a support for the assembly, a pin and slot connection between the assembly and support removably supporting the assembly in operative position, a gear in the support engaged by said gear in the chart assembly frame as the assembly is moved into operative position, and a stop on said support engaging said shift lever and moving it to said one position as the assembly is moved into operative position.

5. A strip chart assembly comprising a frame having a table over which the chart is moved and depending side walls, a guide roll mounted between the side walls at each end of the table, a chart supply roll mounted in the frame below the table for feeding chart mounted between the side walls to one of the guide rolls, a drive gear for the supply roll, a chart take up roll mounted between the side walls below the table for receiving chart from the other of the guide rolls, a drive gear for the take up roll, a shift lever mounted on the frame for movement between two positions and carrying a large gear and a small gear, said small and large gears respectively meshing with the drive gear for the supply roll and the drive gear for the take up roll in one of said two positions and with the drive gear for the take up roll and the drive gear for the supply roll in the other of said two positions, a belt drive between the large and small gears whereby the roll driven by the large gear is driven faster than the roll driven by the small gear in the absence of belt slippage, means for driving said other guide roll in the direction to pull chart from the supply roll for recording, and alternatively usable means for driving said one guide roll in the direction to pull chart from the take up roll for rewinding on the supply roll, said lever being shiftable to said one position for recording and to said other position for rewinding.

References Cited in the file of this patent

UNITED STATES PATENTS

| | | |
|---|---|---|
| 2,275,497 | Berndt | Mar. 10, 1942 |
| 2,611,284 | Albee | Sept. 23, 1952 |
| 2,621,864 | Smith | Dec. 16, 1952 |
| 2,663,609 | Jones | Dec. 22, 1953 |
| 2,669,501 | Young et al. | Feb. 16, 1954 |
| 2,782,680 | Howell | Feb. 26, 1957 |

FOREIGN PATENTS

| | | |
|---|---|---|
| 679,372 | Great Britain | Sept. 17, 1952 |